United States Patent [19]

Brettschneider et al.

[11] 4,007,720
[45] Feb. 15, 1977

[54] FUEL METERING SYSTEM FOR INTERNAL COMBUSTION ENGINES

[75] Inventors: Johannes Brettschneider, Ludwigsburg; Lorenz Bundesen, Flensburg; Heinrich Knapp, Leonberg-Silberberg, all of Germany

[73] Assignee: Robert Bosch G.m.b.H., Stuttgart, Germany

[22] Filed: July 11, 1975

[21] Appl. No.: 595,168

[30] Foreign Application Priority Data

July 30, 1974 Germany .......................... 2436558

[52] U.S. Cl. .................... 123/122 R; 123/122 AA; 123/122 F; 123/32 EA; 219/206; 261/142; 261/145
[51] Int. Cl.² ....................................... F02M 31/00
[58] Field of Search ....... 123/32 EA, 119 R, 122 F, 123/122 AA, 119 F, 122 AB, 122 R; 219/206, 207; 261/145, 142

[56] References Cited

UNITED STATES PATENTS

| 1,173,469 | 2/1916 | White | 123/122 F |
| 1,352,854 | 9/1920 | Warwick | 219/207 |
| 1,422,896 | 9/1922 | Soreng | 219/207 |
| 1,472,246 | 10/1923 | Daniel | 219/207 |
| 3,699,937 | 10/1972 | Petris | 123/119 F |
| 3,806,854 | 4/1974 | Armstrong | 123/119 F |
| 3,898,422 | 8/1975 | Fuller | 123/119 F |
| 3,900,014 | 8/1975 | Bundesen | 123/119 R |

FOREIGN PATENTS OR APPLICATIONS

| 1,042,289 | 10/1958 | Germany | 123/122 F |

*Primary Examiner*—Ronald H. Lazarus
*Attorney, Agent, or Firm*—Edwin E. Greigg

[57] ABSTRACT

A fuel metering system for an internal combustion engine meters out fuel in dependence on the pressure in a fuel supply container. This pressure is controlled by a valve or valves which provide communication with different regions of the induction tube of the engine. The control valves are electro-magnetic valves under the control of a suitably processed and amplified signal from an exhaust gas measuring probe which determines the concentration of oxygen.

5 Claims, 2 Drawing Figures

FUEL METERING SYSTEM FOR INTERNAL COMBUSTION ENGINES

BACKGROUND OF THE INVENTION

The invention relates to a fuel metering system for internal combustion engines and includes a fuel container and a fuel line leading from the fuel container to the induction tube of the engine. Through this fuel line, fuel is added to the air flowing through the induction tube in proportion to the air flow rate. The amount of fuel is controlled by the pressures which prevail in the fuel container and in the induction tube. The pressure prevailing in the fuel container may be changed by means which operate in dependence on engine parameters, and especially in dependence on the output signal of a measuring sensor which determines the composition of the exhaust gas. The air space within the fuel container is connected by air conduits with induction tube regions lying upstream and downstream of the throttle valve and the flow cross section of these air conduits is variable in dependence on the output signal of the measuring sensor.

In view of the very high technical demands being made nowadays on such fuel metering systems, they must automatically create a favorable fuel-air mixture in an internal combustion engine under all operational conditions. In this way, the fuel can be combusted as completely as possible so that, while maintaining the highest possible power, or the lowest possible fuel consumption, as the case may be, the engine produces no or relatively few toxic exhaust components. For this purpose, the fuel quantity added to the combustion air must be precisely regulated and adapted to the requirements of each and every operational state of the internal combustion engine. Thus the average most favorable fuel-air ratio must be made changeable in dependence on engine parameters and, especially on the exhaust gas characteristics and this is done, in the fuel metering system described above, by changing the pressure in the air space of the fuel container. In known fuel metering systems of this type, when the engine operates under low load or low rpm, control fluctuations occur and the amplitudes of these control fluctuations exceed the values which the catalyzer in the exhaust system is capable of correcting. One reason for these control fluctuations is that droplets of fuel are formed on the surface of the throttle valve and on the wall of the induction tube lying upstream of the throttle valve and these droplets enter the passing fuel-air mixture only after considerable delay even when the air flow velocity is changing.

OBJECT AND SUMMARY OF THE INVENTION

It is a principal object of the invention to provide a fuel metering system of the above-described type in which control fluctuations of the fuel-air ratio are avoided.

It is a further object of the invention to enhance vaporization of condensed droplets in the induction tube or to prevent their formation.

These and other objects are attained, according to the invention, by providing that the throttle valve which is part of the fuel metering system is heated electrically. It is a further feature of the invention that the induction tube region which lies immediately upstream of the throttle valve may be heated by exhaust gas. In an advantageous and preferred embodiment of the invention, the throttle valve is heated by means of an electric heating element embodied as a so-called cold conductor plate (a PTC resistor) and by providing a tubulation adjacent to the induction tube region located immediately upstream of the throttle valve and by passing exhaust gas through this tubulation. In the preferred embodiment, a heat-insulating ring may be placed between the induction tube section containing the air measuring member of the engine and the induction tube section containing the throttle valve.

When the throttle valve and the induction tube lying upstream of the throttle valve are both heated, the change of phase of the fuel from the liquid to the vapor state is accelerated and hence the transfer of the fuel to the fuel-air mixture passing through the induction tube is also enhanced. It would not be useful to heat the induction tube region lying downstream of the throttle valve because the only result of such heating would be an improved distribution of the fuel within the fuel-air mixture.

The invention will be better understood as well as other objects and advantages thereof will become more apparent from the ensuing detailed specification of two exemplary embodiments taken in conjunction with the drawing.

DESCRIPTION OF THE FIRST PREFERRED EMBODIMENT

Figure 1:
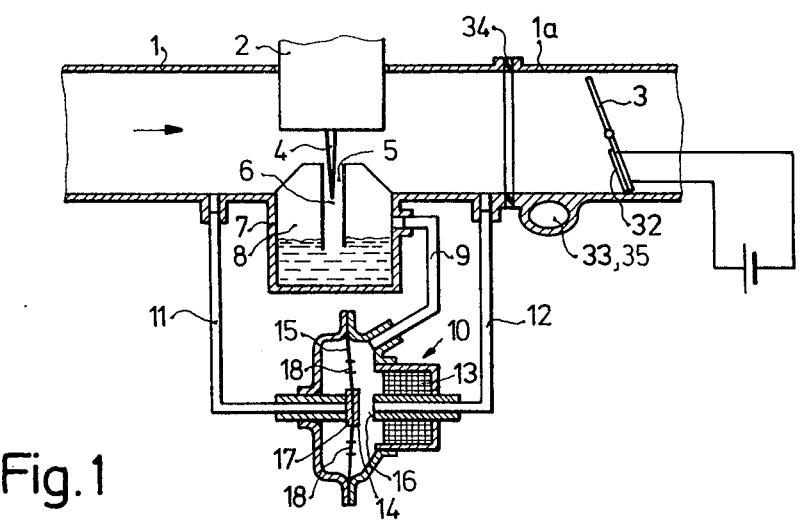
FIG. 1 is a partially sectional and schematic diagram of a first exemplary embodiment of the invention including a diaphragm control valve for controlling the flow cross section in the air conduits, and, FIG. 2 is a diagram of a second exemplary embodiment in which the control of the flow orifices in the air conduits is performed by solenoid valves.

Turning now to FIG. 1, in the fuel metering system there depicted the combustion air travels in the direction of the arrow through an induction tube region 1 containing an air measuring member 2. The air continues to flow through an adjacent induction tube region 1a containing an arbitrarily actuatable throttle valve 3. The air measuring member 2 includes a needle 4 which controls the flow cross section 5 of a fuel metering location near the terminus of a line 6. The line 6 extends into a fuel container 7 and its end remote from the metering location 5 dips into the fuel. The air space 8 located above the fuel within the fuel container 7 communicates with the induction tube through a line 9, a valve 10 and conduits 11 and 12. The conduit 11 leads from the valve 10 to a location in the induction tube ahead of the air measuring member whereas the conduit 12 leads to a location in the induction tube lying behind the air measuring member but ahead of the throttle valve 3 as seen in the direction of the air flow. The valve 10 is embodied as an electro-magnetic diaphragm valve which includes a magnetic coil 13 that actuates an armature 14 which constitutes at least a portion of the diaphragm 15. The diaphragm 15 is disposed between two valve seats 16 and 17 which are located at the ends of the conduits 12 and 11, respectively. The diaphragm 15 also has apertures 18 through which air may flow freely from conduit 11 to the line 9. The magnetic coil 13 is controlled by the amplified current of a measuring sensor located in the exhaust system of the motor vehicle and in a manner not further shown in FIG. 1. Depending on the degree of excitation of the coil, the armature 14, which normally obturates the valve seat 17 is displaced toward the valve seat 16, thereby opening the conduit 11 and simultaneously closing the conduit 12 in varying amounts.

It is also possible to actuate the armature 14 intermittently, i.e., to cause the movable valve member to alternately close the valve seat 16 or the valve seat 17. In either case, the air space 8 within the fuel container 7 is brought closer to induction tube pressure, either that prevailing ahead of or that prevailing behind the fuel metering location 5.

Since it is a principal object of the invention to prevent the condensation of fuel on the surface of the throttle valve 3 and on the interior walls of the induction tube region 1a lying immediately upstream of the throttle valve 3, the throttle valve may be heated by an electric heating element 32, which is preferably embodied as a cold conductor plate (a PTC resistor). It is sufficient if the heating of the throttle valve 3 is confined to heating the lower, upstream surface of the throttle valve 3 by the heating element 32. In addition, the induction tube region 1a may be heated by exhaust gas, and, for this purpose, the induction tube region 1a is provided with a tubulation 33, 35 through which exhaust gas may be diverted from the exhaust gas pipe of the internal combustion engine. The heating process by exhaust gas is a self-stabilizing process because the ratio of the heating power to the amount of fuel to be vaporized remains roughly the same for varying volumes of mixture throughout. The use of a cold conductor plate as the electrical heating element 32 offers the advantage that its temperature remains constant and thus does not cause carbonizing of the fuel or fail to provide sufficient heating power. In order to prevent excessive heating, a heat-insulating ring 34 is provided between the induction regions 1 and 1a.

DESCRIPTION OF THE SECOND PREFERRED EMBODIMENT

Figure 2:
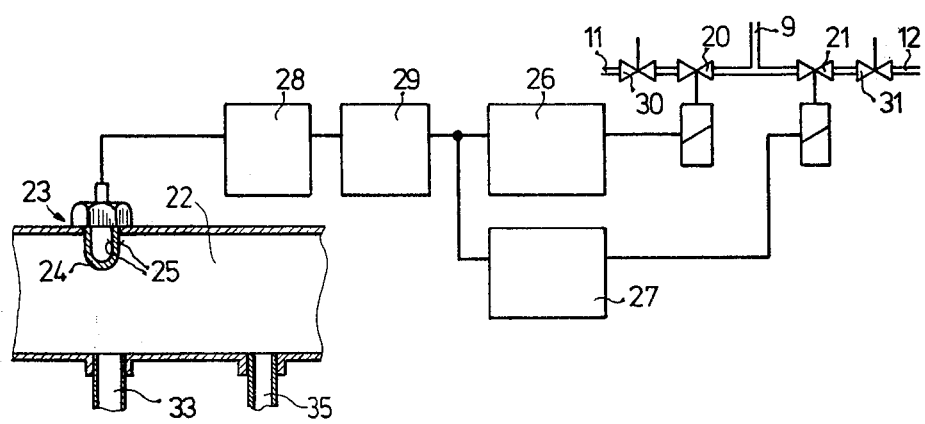

The second preferred embodiment of the invention is illustrated in FIG. 2. The induction tube of the engine and other associated elements of FIG. 1 have not been included in this figure as they remain the same for this embodiment. Thus, FIG. 2 only shows the line 9 leading to the fluid container as well as the two control conduits 11 and 12, terminating in the induction tube. In this second exemplary embodiment, the conduits 11 and 12 are controlled by solenoid valves 20 and 21, respectively, which may be opened or closed either alternatively or simultaneously. An exhaust pipe 22 contains the measuring sensor 23 which is embodied as a small tube 24, sealed at one end and consisting of a solid electrolyte, for example sintered zirconium dioxide. Both sides of the tube 24 are coated with a layer of microporous platinum 25 which is provided with contacts that are not shown and to which an electrical potential may be applied. One side of the tube is in contact with the atmospheric air and the other side is in contact with the exhaust gases of the motor vehicle. At the temperatures which prevail in the exhaust gas of an internal combustion engine, the solid electrolyte becomes conducting for oxygen ions.

Whenever the partial pressure of oxygen in the exhaust gas deviates from the partial pressure of oxygen of the atmospheric air, an electric potential difference appears between the two platinum layers or between the two contacts which are not shown and this potential behaves in a manner characteristic of the air number $\lambda$.

The potential difference is a logarithmetic function of the quotient of the partial pressures of oxygen on the two sides of the solid electrolyte. For this reason, the output potential appearing at the oxygen sensor abruptly changes in the vicinity of the value of the air number $\lambda = 1.0$, for, when $\lambda$ is greater than 1.0, uncombusted oxygen suddenly appears in the exhaust gas. As a consequence of the very strong dependence of the output potential at the measuring sensor on the air number $\lambda$, this oxygen sensor is exceedingly suitable for controlling the above mentioned electro-magnetic valve. The output potential of the oxygen sensor is relatively high when $\lambda$ is less than 1 and relatively small when $\lambda$ is greater than 1.

The control of the magnetic valves is effected by using only the large and small potentials exceeding a threshold value in each case. In this manner, the pressure in the air chamber 8 of the fuel container 7 is charged until an air number $\lambda \approx 1.0$ is reached which has been shown to be particularly favorable and which corresponds to a stoichometric mixture of air and fuel. In order to maintain the desired control process, the magnetic valve 20 is controlled by the potential lying below a lower threshold whereas the magnetic valve 21 is controlled by the high potential lying above the upper threshold. Thus, when the valve 20 is opened, the pressure in the fuel container 7 increases and the fuel concentration in the fuel-air mixture increases, whereas, when the magnetic valve 21 is opened, the fuel concentration in the fuel-air mixture decreases.

Connected between the oxygen sensor 23 and the magnetic valves 20, 21 are threshold amplifiers 26 and 27, respectively, which respond only when their input voltages exceed the lower or upper voltage limits, respectively, and which amplify the voltages for the purpose of controlling the magnetic valves. However, it may be advantageous to connect a pulse-shaping circuit 28 ahead of the threshold amplifiers for generating an unambiguous rectangular signal from the abrupt changes of the oxygen sensor potential. This rectangular signal then is fed to an integral controller 29 which uses it to generate uniformly increasing and decreasing portions of a voltage curve from which the threshold amplifiers derive the voltages which exceed the upper and lower threshold values, respectively.

In order to prevent excessive output voltages from the integral controller 29 in both polarities, it may be suitable to include a voltage-limiting circuit within the integral controller. This improves the control process and permits the magnetic valves 20, 21 to be rapidly de-energized after the sensor voltage has reversed.

The integral controller 29 may also include an integrated circuit which produces a very steep voltage jump when the input voltage changes direction, so as to overcome any possible hysteresis in the threshold amplifier.

It may be suitable to provide the air conduits 11, 12 with optional, arbitrarily changeable throttles 30, 31 respectively.

The pulse shaper 28 in FIG. 2 is constructed in the same way as the threshold amplifiers 26 or 27 which may also be designated as threshold switches. Such threshold switches are known, for example, from U.S. Pat. No. 3,745,768 FIG. 6, reference numerals 700 and 710, as well as from the corresponding description portion of this patent. The integral control unit 29 may be, for example, the integral controller which is shown as an active element low pass filter 22 in FIG. 9 of this same patent, wherein a low pass filter is a special kind of integral controller. The basic building blocks for threshold switches and integral controllers can be commercially available operational amplifiers, for example, operational amplifiers of Siemens designated by TAA862. Such an operational amplifier operates as an integrator if a condenser is connected between the output and the inverting input of the operational amplifier. U.S. Pat. No. 3,759,232 also shows an operational amplifier 262 in FIG. 3, which is connected as a threshold switch by means of a feedback resistor 263, connected between the output and the non-inverting input. The operational amplifier 250 is connected as an integrator by means of the capacitor 251. Additionally, U.S. Pat. No. 3,782,347, which shows in FIG. 4 a threshold switch 11 and an integral controller 10, discloses suitable threshold amplifiers.

What is claimed is:

1. In a fuel metering system, for use with an internal combustion engine, the system including:
   A. an air induction tube containing a throttle valve;
   B. an exhaust pipe;
   C. a fuel container connected by an air conduit with the induction tube of the engine;
   D. sensor means, for determining the chemical composition of the exhaust gas of the engine and providing an output signal; and
   E. valve means, located in said air conduit, for changing the effective flow cross section thereof and controlled by the output signal from said sensor means; the improvement in the fuel metering system comprising:
   F. an electric heating element mounted on at least a portion of the upstream surface of the throttle valve in the induction tube for supplying heat thereto to vaporize fuel droplets condensed on said upstream surface; and
   G. heating means located adjacent and upstream of the throttle valve, for heating up a portion of the interior wall of the induction tube in the immediate region of the heating means, said electric heating element and said heating means cooperating to prevent the condensation of fuel on the surface of the throttle valve and on the interior walls of the induction tube region lying immediately upstream of the throttle valve.

2. A fuel metering system as defined in claim 1, wherein said electric heating element is a cold conductor platelet (PTC resistor).

3. A fuel metering system as defined in claim 1, wherein said heating means is a tubulation, located adjacent to the induction tube in a region lying upstream of the throttle valve through which exhaust gas may be passed.

4. A fuel metering system as defined in claim 1, wherein the induction tube is composed of at least two abutting parts, one of which includes the throttle valve, and wherein a thermally insulating member is disposed between said abutting parts of the induction tube.

5. A fuel metering system as defined in claim 1, wherein said portion of the upstream surface of the throttle valve is a lower portion.

* * * * *